(12) United States Patent
Ihara et al.

(10) Patent No.: US 6,336,073 B1
(45) Date of Patent: Jan. 1, 2002

(54) INFORMATION TERMINAL DEVICE AND METHOD FOR ROUTE GUIDANCE

(75) Inventors: Yasuhiro Ihara, Kobe; Akihiro Suzuki, Neyagawa; Nobuyuki Nakano, Toyonaka; Hisaya Fukuda, Sakai, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/626,122

(22) Filed: Jul. 26, 2000

(30) Foreign Application Priority Data

Jul. 29, 1999 (JP) .......................................... 11-215797

(51) Int. Cl.$^7$ ....................... G01C 21/00; G08G 1/0969
(52) U.S. Cl. ....................... 701/202; 701/208; 701/211; 340/990
(58) Field of Search ................................. 701/202, 201, 701/208, 209, 210, 211, 212; 340/988, 990, 995

(56) References Cited

U.S. PATENT DOCUMENTS

| | | | | |
|---|---|---|---|---|
| 5,543,789 A | * | 8/1996 | Behr et al. .................. | 340/995 |
| 5,913,918 A | * | 6/1999 | Nakano et al. ............. | 701/208 |
| 5,945,976 A | * | 8/1999 | Iwamura et al. ............ | 345/139 |
| 6,006,161 A | * | 12/1999 | Katou ......................... | 701/212 |
| 6,040,824 A | * | 3/2000 | Maekaw et al. ............ | 345/173 |
| 6,041,281 A | * | 3/2000 | Nimura et al. .............. | 701/211 |
| 6,073,075 A | * | 6/2000 | Kondou et al. ............. | 701/203 |
| 6,115,669 A | * | 9/2000 | Watanabe et al. .......... | 701/209 |
| 6,121,900 A | * | 9/2000 | Takishita ..................... | 340/995 |
| 6,182,010 B1 | * | 1/2001 | Berstis ........................ | 701/211 |
| 6,199,014 B1 | * | 3/2001 | Walker et al. .............. | 701/211 |
| 6,202,022 B1 | * | 3/2001 | Ando .......................... | 701/200 |
| 6,202,026 B1 | * | 3/2001 | Nimura et al. .............. | 701/211 |

FOREIGN PATENT DOCUMENTS

| | | |
|---|---|---|
| JP | 9-229694 | 9/1997 |
| JP | 10-103977 | 4/1998 |

* cited by examiner

*Primary Examiner*—Tan Nguyen
(74) *Attorney, Agent, or Firm*—Wenderoth, Lind & Ponack, L.L.P.

(57) ABSTRACT

In an information terminal device, a processor receives route information on a route from a start point to a destination and guidance information required for route guidance, in accordance with a standard communications protocol. The processor guides the route from the start point to the destination through an information presentation part by using first cartographic data having a basis on the received route information and the guidance information. The processor requests, as required, a specific information service center for point information in a tag format showing details of each important point (POI) on the route through an information request part. As a result, the processor receives the point information on the important point from the information service center in accordance with the standard communications protocol. The processor presents the received point information on the important point simultaneously with a map based on the first cartographic data to clearly indicate each of the important points on the route. With the aid of the tag format, the information terminal device is capable of receiving, using the standard communications protocol, various information in the suitable format for the route guidance.

20 Claims, 16 Drawing Sheets

FIG. 7 (a)

```
def [ID]
    <IDname></IDname>
    <size></size>
    <update></update>
```

ID-TYPE DEFINITION

FIG. 7 (b)

```
def [POI-ID]
    <IDname></IDname>
    <size></size>
    <update></update>
    <phone></phone>
```

POI-ID-TYPE DEFINITION

FIG. 7 (c)

```
def [POS]
    <longitude></longitude>
    <latitude></latitude>
```

POS-TYPE DEFINITION

FIG. 7 (d)

```
def [POI]
    [POI-ID]
    <kind></kind>
    [POS]
    <zip></zip>
    <address></address>
    <url></url>
    <service></service>
    <worktime></worktime>
    <bodyinfo></bodyinfo>
    <body></body>
```

POI-TYPE DEFINITION

F I G. 9 (a)

```
def [route]
  [ID]
  <roadname></roadname>
  <crossname></crossname>
  [POS]     (CROSSING LOCATION)
  <disttonext></disttonext>
  <direction></direction>
  [POS]     (START POINT LOCATION)
  [POS]     (DESTINATION LOCATION)
  [POS]     (PASSING POINT LOCATION)
  <parameter></parameter>
```

ROUTE-TYPE DEFINITION

F I G. 9 (b)

```
def [guidance]
  [ID]
  <crossno></crossno>
  <poiid></poiid>
  <inroad></inroad>
  <outroad></outroad>
  <IDname></IDname>
```

GUIDANCE-TYPE DEFINITION

F I G. 1 0 (a)

```
[ID]
<roadname>AOYAMA STREET</roadname>
<crossname>MIYAKEZAKA</crossname>
[POS]    (CROSSING LOCATION)
<disttonext>3 0 0m</disttonext>
<direction>RIGHT</direction>
    :
[POS]    (START POINT LOCATION)
[POS]    (DESTINATION LOCATION)
[POS]    (PASSING POINT LOCATION)
    :
<parameter>CAR/SHORTEST TIME</parameter>

ROUTE SEARCH RESULT EXAMPLE
```

F I G. 1 0 (b)

```
[ID]
<crossno>1</crossno>
<inroad>AOYAMA STREET</inroad>
<outroad>UCHIBORI STREET TO EAST</outroad>
<poid>Y ASSEMBLY HALL, 03-3333-9999</poid>
<poid>SAKURADA MOAT, NO PHONE NUMBER</poid>
    :
<crossno>N-TH ON TRAFFIC REGULATION MAP</crossno>
<inroad>SAKURADA STREET</inroad>
<outroad>SOTOBORI STREET</outroad>
<poid>Z STORE, 03-3333-1111</poid>
    :

GUIDANCE INFORMATION EXAMPLE
```

FIG. 12 (a)

<phone>03-3333-1111</phone>

CONVERSION REQUEST

FIG. 12 (b)

<IDname>Z STORE</IDname>
<size>206 BYTES</size>
<update>JAN. 28, 1999</update>
<phone>03-3333-1111</phone>
<kind>DAILY ITEMS/CONVENIENCE STORE</kind>
<longitude>135° 35' 35" 35 EAST LONGITUDE</longitude>
<latitude>41° 41' 41" 41 NORTH LATITUDE</latitude>
<zip>111-1111</zip>
<address>···CHIYODA-KU, TOKYO</address>
<url>http://www.z-store.co.jp</url>
<service>BARGAIN-PRICED BREADS</service>
<worktime>OPEN EVERY DAYS/9:00-17:00</worktime>
<bodyinfo>HTML</bodyinfo>
<body>·····</body>

RESULT OF CONVERSION

```
def [MAP]
  [ID]
  <type></type>
  <function></function>
  <maker></maker>
  <format></format>
  <dispsize></dispsize>
  [POS]                    (TOP-LEFT COORDINATES)
  [POS]                    (BOTTOM-RIGHT COORDINATES)
  <body></body>
```

MAP-TYPE DEFINITION

FIG. 15(a)     FIG. 15(b)
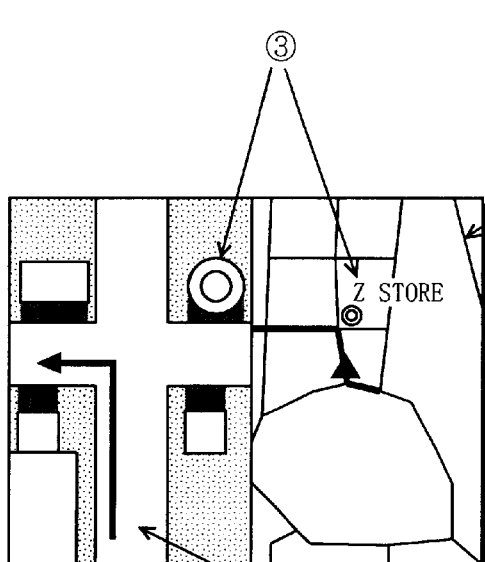
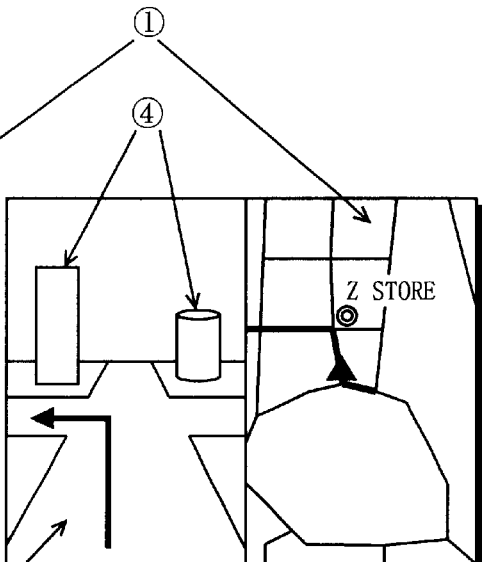
FIG. 16
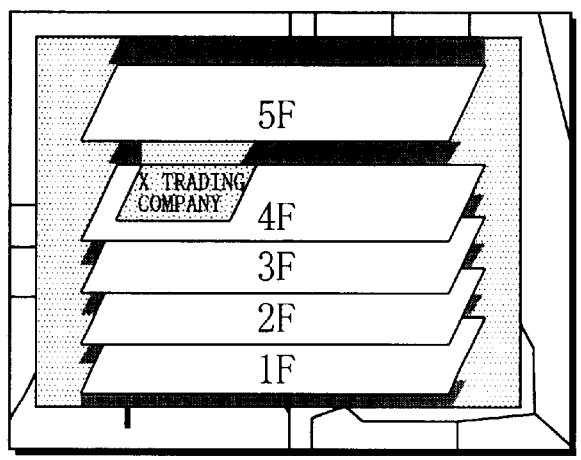

FIG. 17 (a)

```
SEARCH RESULTS FOR X TRADING COMPANY

1. X TRADING COMPANY (1)
2. X TRADING COMPANY (2)
3. X TRADING COMPANY A BRANCH
4. X & Co.
```

FIG. 17 (b)

```
ROUTE FROM SIBUYA TO SHINBASHI

1. AOYAMA STREET   → MIYAKEZAKA    : RIGHT
2. UCHIBORI STREET → SAKURADAMON   : RIGHT
3. SAKURADA STREET → TORANOMON     : LEFT
4. SOTOBORI STREET → 【SHINBASHI】
```

FIG. 17 (c)

```
GUIDANCE TO SHINBASHI

3. SAKURADA STREET
       ↓   TURN LEFT AT TORANOMON CROSSING
       ↓   LANDMARK : Z STORE
4. SOTOBORI STREET
```

INFORMATION TERMINAL DEVICE AND METHOD FOR ROUTE GUIDANCE

BACKGROUND OF THE INVENTION

1. Field of the Invention

The present invention relates to information terminal devices, and more specifically to an information terminal device capable of displaying a vicinity of a present location, destination, specific point, and the like, receiving point information such as information on tourist attractions, restaurants, and accommodations (so called POI information) from information servers, providing, to a user, information on a route, distance, time distance, and traffic to the point, and further capable of utilizing enormous amounts of and the latest information through a communications function.

2. Description of the Background Art

One example of a conventional information terminal device is disclosed in Japanese Patent Laying-Open No. 9-229694 (1997/229694). FIG. 18 shows a navigation data adding system 1800 in which a navigation system 1801, as an exemplary information terminal device, and an additional data providing system 1802 are communicably connected.

In the navigation system 1801, a storage medium 1803 is implemented by a CD-ROM, for example. The storage medium 1803 stores cartographic data and sightseeing information. A user operation is detected by an input detector 1804 and then recognized by a controller 1807. The user operation is, for example, a selection made on a menu displayed on a display 1805. On receiving the selection, the controller 1807 accesses the storage medium 1803 to fetch the cartographic data and the sightseeing information for display on the display 1805.

Next, described is a case where the navigation system 1801 receives, for display, additional data from the additional data providing system 1802 through communications. In such case, the controller 1807 first determines what additional data is to be requested based on screen contents indicating a screen currently being displayed and being stored in a display contents storage 1806. A transmitter 1809 transmits a data request requesting the determined additional data. After transmission of the data request, the additional data transmitted from the additional data providing system 1802 is received by a receiver 1811 and stored in an additional data storage 1810. Thereafter, an image generator 1808 embeds the additional data in a predetermined template to generate a display screen. Finally, the display screen is displayed on the display 1805.

On the other end, in the additional data providing system 1802, a data search part 1815 performs a search in response to the data request which is transmitted from the navigation system 25 1801 and received at the receiver 1812. A data conversion part 1813 converts the search result into a format suitable for communications and a transmitter 1814 transmits the converted data to the navigation system 1801. Further, the additional data providing system 1802 accesses an external network 1819 through a network access part 1817 and receives information therefrom. The received information is sent to a data generator 1818. Based on the received information, the data generator 1818 generates data required as service data. The generated data is stored in a data storage 1816 and provided to the navigation system 1801 through the data search part 1815 as the additional data.

With such configuration, the navigation system 1801 receives the latest and detailed information from the additional data providing system 1802.

As another example of the conventional information terminal device, a car navigation device with a communications function is disclosed in Japanese Patent Laying-Open No. 10-103977 (1998/103977). The car navigation device according to the publication first searches local data and then an access point of an ISP (Internet Service Provider) close to a present location. The car navigation device thus provides detailed information on facilities in the vicinity of the present location to a user by displaying home pages (Web sites) thereof. In specific, according to the invention disclosed in the publication, a WWW (World Wide Web) browsing function, which is normally installed in personal computers, is installed in the car navigation device. The car navigation device internally stores URLs of home pages in correspondences with locations of an owner of the device. In this manner, the car navigation system is able to display detailed information on an arbitrary vicinity area on a map by using the WWW browser, thereby allowing a car navigation system to receive the latest and detailed information.

The information terminal devices disclosed in the above publications are both capable of receiving the latest and detailed information through the use of the communications function. The information terminal devices, however, each have following problems. Note that in the publications No. 9-229694 (1997/229694) and No. 10-103977 (1998/103977), the navigation system 1801 and the car navigation device respectively serve as the information terminal device.

First, the problem of the information terminal device according to the publication No. 9-229694 (1997/229694) lies in the fact that the information terminal device (navigation system 1801) and the information server (additional data providing system 1802) communicate using a communications protocol exclusively dedicated thereto in the navigation data adding system 1800. To be specific, the additional data providing system 1802, as its name implies, provides additional information of predetermined contents to the information terminal device as an update. That means, when displaying restaurant information, for example, the information terminal device requests transmission of additional data by designating an information screen number. As such, the information terminal device and the information server are engaged too often.

Accordingly, if the information server provides a new service with new information display feature, it is required to update not only the information server but also the information terminal device. Further, whenever a new model of the information terminal device is released, it is also required to newly set up a corresponding information server. As it is difficult to immediately discontinue the services for the old models provided from the existing servers, business costs run up.

On the other hand, the information terminal device of the publication No. 10-103977 (1998/103977) can access enormous amounts of information all over the world by using a standard communications protocol and the WWW browser. The information terminal device, however, is only capable of displaying home pages on the WWW and displaying the locations of their owners on the map. Therefore, the problem comes up that information is not provided to users in a format suitable for a function such as route guidance.

SUMMARY OF THE INVENTION

Therefore, an object of the present invention is to provide an information terminal device capable of receiving various information in a format suitable for route guidance by using a standard communications protocol.

A first aspect of the present invention is directed to an information terminal device structured to be mobile and having access to a plurality of information service centers on a network which is using a predetermined protocol for communications, wherein, each of the information service centers is structured as being capable of transmitting information in a tag format indicating attributes and contents of the information in accordance with the communications protocol, the device comprising a first receiver receiving route information indicating a route from a start point to a destination and guidance information for guiding the route, a route guidance part guiding the route from the start point to the destination by using first cartographic data having a basis on the route information and/or the guidance information received by the first receiver, and a second receiver receiving, from each of the information service centers, point information in the tag format indicating details of each important point on the route guided by the route guidance part, as required, wherein, the route guidance part presents the point information received by the second receiver simultaneously with a map based on the first cartographic data to clarify each important point on the route.

As described in the prior art section, the information terminal device is not capable of receiving information from various service centers if the information terminal device and each information service center perform data communications with the exclusive communications protocol.

In the first aspect, however, the information terminal device and each information service center perform data communications in accordance with a standard communications protocol used in a communications network. Therefore the information terminal device can communicate with every information service center on the communications network, increasing user's choices of information. Further, a format of information exchanged between the information terminal device and each information service center is standardized. Thereby, each information service center can provide various information services without restraint as long as the information is provided in the tag format. Accordingly, the information terminal device is not necessary to be added with a new function even if a new information service is provided, resulting in reduction of business costs.

Still further, with use of the tag format, the point information easily becomes related more closely to the cartographic data. Therefore, a plurality of information can be presented to a user at the same time, thereby realizing the route guidance flexibly suiting the preferences of the user.

According to a second aspect, in the first aspect, the guidance information includes ID information simply specifying each important point, the device further comprises a request part sending a request for a search for the point information using the ID information to each of the information service centers, as required, and the second receiver receives the point information from each of the information service centers after the request is sent by the request part.

As described in the second aspect, the request part requests the point information, as required. Therefore, the information terminal device having flexibility on reception of the point information can be provided. For example, the information terminal device receives the point information when having high processing capacity and does not receive the point information when having low processing capacity.

According to a third aspect, in the second aspect, the ID information is any of a phone number, an address, and a zip code, each of the information service centers converts any of the phone number, the address, and the zip code received as a keyword to a combination of longitude and latitude coordinates, and the second receiver receives the point information on each important point including the combination of the longitude and latitude coordinates thereof.

According to a fourth aspect, in the second aspect, the ID information is a combination of the longitude and latitude coordinates, each of the information service centers converts the combination of the longitude and latitude coordinates received as a keyword to the phone number, the address and/or the zip code, and the second receiver receives the point information on each important point including the phone number, the address and/or the zip code thereof.

As described in the third and the fourth aspects, the information service center is capable of providing various conversion functions to the information terminal device upon requests made therefrom, and thus is capable of providing information services with more variations.

According to a fifth aspect, in the first aspect, the point information includes second cartographic data having a scale different from that of the first cartographic data, and the route guidance part presents a map based on the second cartographic data received by the second receiver simultaneously with the map based on the first cartographic data.

According to a sixth aspect, in the fifth aspect, the second cartographic data is cartographic data for showing an enlarged map of a vicinity of the important point.

According to a seventh aspect, in the fifth aspect, the second cartographic data is cartographic data for three-dimensionally showing a vicinity of the important point.

According to an eighth aspect, in the first aspect, the point information is the second cartographic data for showing details in a building or an underground mall as being the important point, and the route guidance part presents a map based on the second cartographic data received by the second receiver simultaneously with the map based on the first cartographic data.

According to a ninth aspect, in the fifth aspect, when the second receiver receives a plurality of second cartographic data, the route guidance part presents the map based on the second cartographic data of the largest data size simultaneously with the map based on the first cartographic data.

According to a tenth aspect, in the fifth aspect, when the second receiver receives a plurality of second cartographic data, the route guidance part presents the map based on the second cartographic data of the smallest data size simultaneously with the map based on the first cartographic data.

According to an eleventh aspect, in the fifth aspect, when the second receiver receives a plurality of second cartographic data, the route guidance part presents the map based on the latest second cartographic data simultaneously with the map based on the first cartographic data.

As described in the fifth to the eleventh aspects, the route guidance part simultaneously displays the map based on the second cartographic data with the map based on the first cartographic data in accordance with the priorities respectively described in the aspects. In this manner, user-friendly route guidance further reflecting the user's preferences can be presented.

According to a twelfth aspect, in the first aspect, the device further comprises a request part sending requests to the plurality of information service centers for searches for information relevant to a point that a user is interested in, based on a keyword relevant to the point that the user is interested in, a third receiver receiving the search results from the plurality of information service centers after the requests are sent by the request part, and a presentation part presenting the search result received by the third receiver to the user, wherein, the route guidance part guides a route to a point which is selected as the destination from among the search results presented by the presentation part.

As described in the twelfth aspect, the information terminal device can present the search results from each of the information service centers as candidates for the destination, thereby enhancing the user's choices of the destinations.

According to a thirteenth aspect, in the twelfth aspect, when the third receiver receives a plurality of search results, the presentation part presents the search result of a larger data size with higher priority.

According to a fourteenth aspect, in the twelfth aspect, when the third receiver receives a plurality of search results, the presentation part presents the search result of a smaller data size with higher priority.

According to a fifteenth aspect, in the twelfth aspect, when the third receiver receives a plurality of search results, the presentation part presents the search result of a later date of update with higher priority.

As described in the thirteenth to fifteenth aspects, the information terminal device presents the candidates for the destination to a user based on the priorities respectively described in the aspects. In this manner, the user can easily select the destination meeting his/her preference from many candidates.

According to a sixteenth aspect, in the first aspect, the point information includes first information simply specifying the important point and second information specifying the important point in detail, and the first information includes at least tags specifying a name and a phone number of the important point.

As described in the sixteenth aspect, the point information includes at least the first information simply specifying the important point. Accordingly, the point information has the data structure in which the first information is easily separated from the second information. The information terminal device of the low processing capacity thus presents only the first information to the user, and that of the high processing capacity presents other information included in the point information.

According to a seventeenth aspect, in the first aspect, the route information includes at least tags specifying a name of a road to be traveled, a name of a crossing being a branch point, a distance between the branch points, and a turning direction at the branch point.

As described in the seventeenth aspect, the route in the route information can be simply specified by the tags. Accordingly the route information has the data structure in which a plurality of information are easily separated from each other. The information terminal device of the low processing capacity thus performs the route guidance based on the simple route information, and that of the high processing capacity performs the route guidance based on other information included in the route information.

According to an eighteenth aspect, in the first aspect, a crossing number is uniquely determined for each of nationwide crossings, and the route information includes at least tags specifying the crossing number.

As described in the eighteenth aspect, by including the tags specifying the crossing number, the route information can specify the crossing on the route with a more simple format.

According to a nineteenth aspect, in the seventeenth aspect, the guidance information includes the branch point described in the route information in the tag format, and information on at least a name and a phone number of a point being a landmark for the branch point.

As described in the nineteenth aspect, the route information includes at least the name and the phone number of the point being the landmark for the branch point. Accordingly, the route information has the data structure in which a plurality of information are easily separated from each other.

A twentieth aspect of the present invention is directed to a method for route guidance used for an information terminal device structured to be mobile and having access to a plurality of information service centers on a network which is using, or uses, a predetermined protocol for communications, wherein, each of the information service centers is structured as being capable of transmitting information in a tag format indicating attributes and contents of the information in accordance with the communications protocol, the method comprising the steps of receiving route information indicating a route from a start point to a destination and guidance information for guiding the route, guiding the route from the start point to the destination by using cartographic data having a basis on the route information and/or the guidance information received in the receiving step by using cartographic data, and receiving, from each of the information service centers, point information in the tag format indicating details of each important point on the route guided in the guiding step, as required, wherein, in the guiding step, the point information received in the point information receiving step is presented simultaneously with a map based on the cartographic data to clarify each important point on the route.

As described in the twentieth aspect, similarly to the first aspect, reduction of the business costs can be achieved and also the route guidance flexibly suiting the user's preferences can be realized.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 7(a) to 7(d) show an ID-type definition, a POI-ID-type definition, a POI-ID type definition, POS-type definition, and a POI-type definition, respectively that are handled by the information terminal device 100 and the information service center 310, and the like according to each embodiment.

FIGS. 9(a) and 9(b) show a route-type definition and a guidance-type definition, respectively, that are handled by the information terminal device 100 and the information service center 310, and the like according to each embodiment.

FIGS. 10(a) and 10(b) show specific examples of the route-type and the guidance-type information in FIG. 9(a) and 9(b), respectively.

FIGS. 12(a) and 12(b) show examples of a search request transmitted from an information request part 109 in step S505 of FIG. 6 and a search result received at a processor 104 in step S506 of FIG. 6, respectively.

FIG. 15 shows route guidance displays characterizing the first embodiment.

FIG. 16 shows a display on the information presentation part 108 of the information terminal device 100 according to the first embodiment which is showing a location of X trading company being a destination.

FIGS. 17(a) to (c) show route guidance presented by the information terminal device 100 according to the second embodiment.

DESCRIPTION OF THE PREFERRED EMBODIMENTS (First Embodiment)

First, words used in embodiments are defined. "POI" is an acronym of a Point Of Interest and means a point that a user is concerned with or interested in (tourist attraction, hotel, restaurant, firm etc.). "POI information" means information relevant to the POI.

Figure 1:
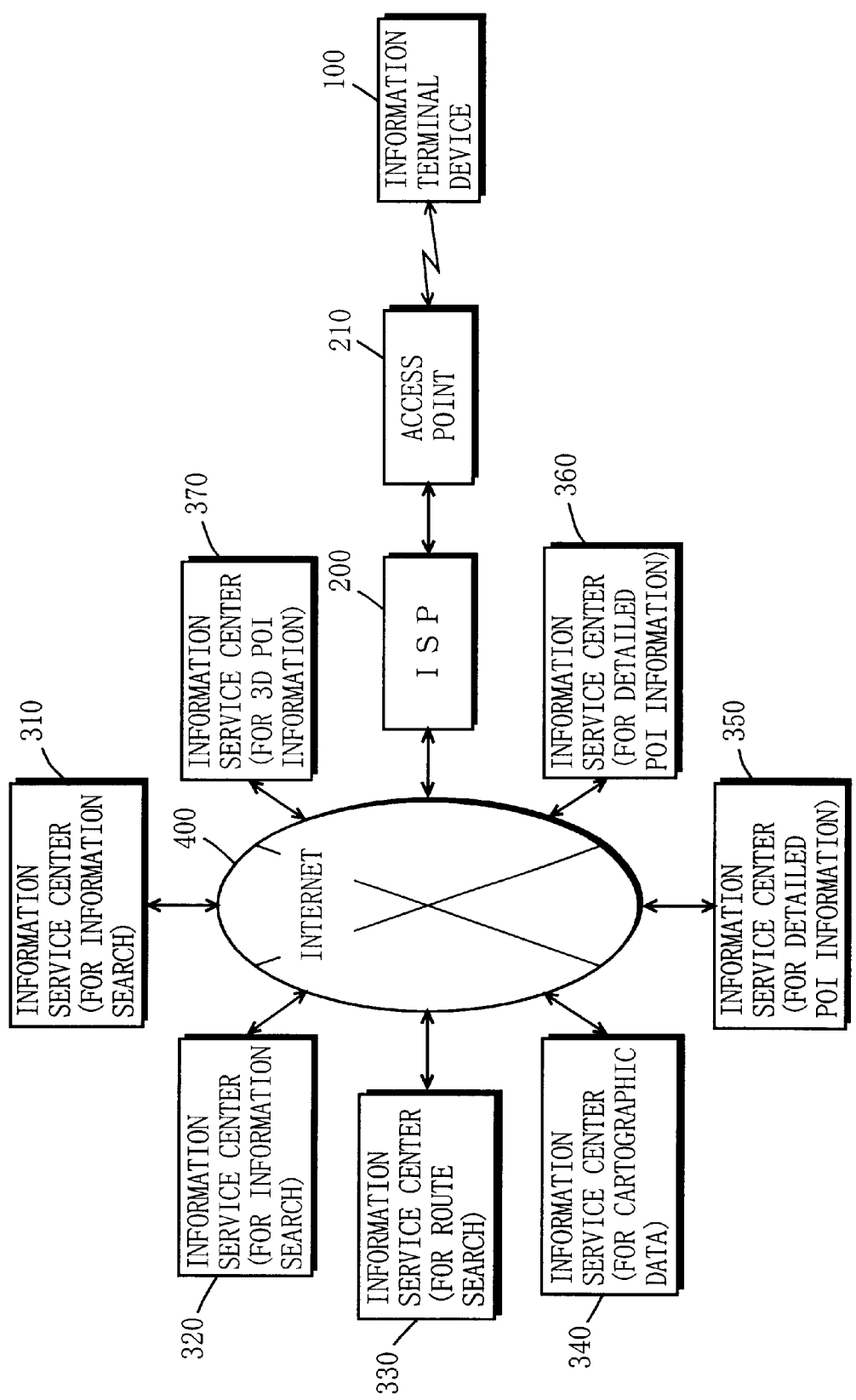
FIG. 1 is a communications environment for an information terminal device 100 according to first and second embodiments of the present invention.

Next, a communications environment for an information terminal device 100 according to the embodiments of the present invention is described by referring to FIG. 1. The information terminal device 100 has access to a plurality of information service centers 310 to 370 on the Internet 400 through an ISP (Internet Service Provider) 200.

The information terminal device 100 is structured to be carried in a motor vehicle or carried by a user for mobility. The ISP 200 provides a service for accessing to the Internet 400 for subscribers. Typical services of the ISP 200 are to send and receive e-mails and to browse home pages. A business operator of ISP 200 sets up an access point 210 at a predetermined location and manages the access point 210.

The subscriber (user) operates his/her information terminal device 100 to access the ISP 200 through the access point 210. The access is usually made using a mobile phone or a PHS (Personal Handy phone System). If connected to the ISP 200, the information terminal device 100 can be provided with the above described services. A standard communications protocol used between the information terminal device 100 and the ISP 200 is normally the PPP (Point to Point Protocol). The PPP enables the TCP/IP packet communications which is the Internet standard. Therefore, by designating a URL (Uniform Resource Locator), the information terminal device 100 is able to access the information service centers 310 to 370 on the Internet 400 through the ISP 200.

Each of the information service centers 310 to 370 provides various information in response to a request from the information terminal device 100. In the present embodiment, for specific description, each of the information service centers 310 to 370 is assumed to provide the following information. The information service centers 310 and 320 each perform information searches based on a keyword received from the information terminal device 100, and transmit the search results to the information terminal device 100. The information service center 330 provides route information and guidance information both necessary for guiding a route for the mobile information terminal device 100. The information service center 340 provides cartographic data for two-dimensionally indicating a vicinity of POI in detail. The information service centers 350 and 360 each provide POI information. The information service center 370 provides cartographic data for three-dimensionally indicating the vicinity of POI in detail.

Note herein, that various information or data being provided has the same format called a tag format. Since the PPP is used as the communications protocol, each of the information service centers 310 to 370 assembles TCP/IP packets based on the various information or data having the tag format for transmission to the information terminal device 100.

The ISP 200 only relays the TCP/IP packets during the communications between the information service centers 310 to 370 and the information terminal device 100. That means that the ISP 200 simply works according to the PPP but does not perform specific processing. The user of the information terminal device 100, therefore, feels as if directly accessing each of the information service centers 310 to 370. Accordingly, the user of the information terminal device 100 becomes ready to receive information or data from, for example, the information service center 310 only by changing the URL. The URLs required herein may be previously stored in the information terminal device 100 or may be provided to the information terminal device 100 by the ISP 200. In general, the URLs of the information service centers 310 to 370 are each obtained with a search engine that presents the URL as a result of a keyword search.

Figure 2:
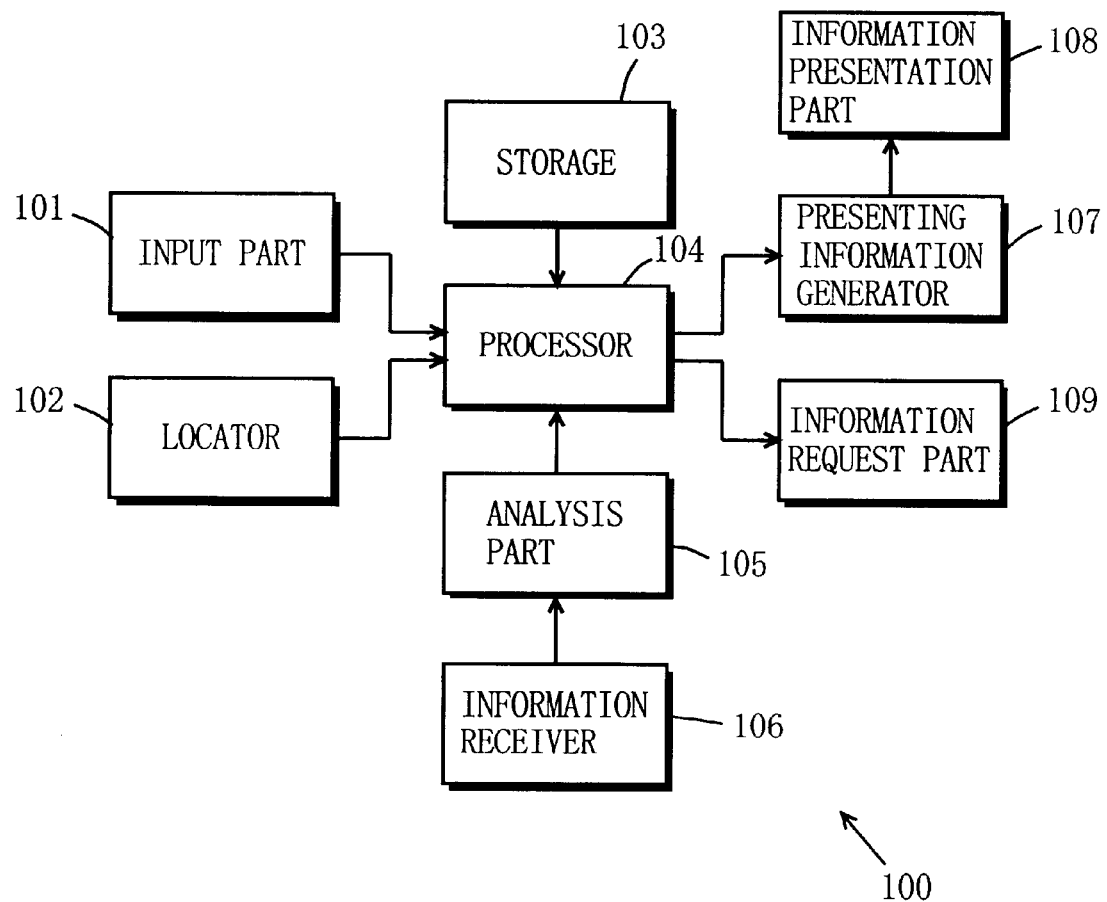
FIG. 2 is a block diagram showing the information terminal device 100 shown in FIG. 1 in detail.

Next, by referring to FIG. 2, a detailed block configuration of the information terminal device 100 according to the first embodiment is described. In FIG. 2, the information terminal device 100 includes an input part 101, a locator 102, a storage 103, a processor 104, an analysis part 105, an information receiver 106, a presenting information generator 107, an information presentation part 108, and an information request part 109.

The input part 101 detects a user operation and notifies the processor 104 of the detected user operation. The locator 102 detects a present location of the mobile information terminal device 100 and notifies the processor 104 of the detected location. The present location can be detected by using the GPS (Global Positioning System), an autonomous navigation, a PHS, a cellular phone, and a combination among GPS and any other possible method. The storage 103 stores data required for route guidance such as cartographic data, and further stores the POI information, as required.

The information receiver 106 receives information (data) transmitted by each of the information service centers 310 to 370 via the ISP 200. In a case of using the PPP, the information terminal device 100 and one or more of the information service centers 310 to 370 communicate bidirectionally. The information receiver 106 can alternatively receive information (data) from the broadcast media such as an FM broadcast, a digital satellite broadcast, or a digital terrestrial broadcast. In this case, the information terminal device 100 can get the information from the information service centers 310 to 370 via the broadcast media. Basically, in a broadcast system, only a down link (single communication path from the information service centers 310 to 370 to the information terminal device 100) is available. The information terminal device 100 therefore may not request the information, but selectively receives necessary information from various information repeatedly broadcast on each channel. It is also possible to utilize a system in which a request for information is made through a low-speed communication path (up link) and a response thereto is made through a high-speed broadcasting (down link). The information (data) received by the information receiver 106 in such manner is forwarded to the analysis part 105.

The analysis part 105 conducts a predetermined analysis on the information received from the information receiver 106 and forwards the analysis result to the processor 104. The analysis made herein is described later.

The processor 104 performs processing necessary for route guidance unique to the present invention based on the user operation detected by the input part 101, the present location detected by the locator 102, the information (data) stored in the storage 103, and the result of the analysis made by the analysis part 105. The processor 104 outputs the result of the processing to the presenting information generator 107. The presenting information generator 107 formats the received result suitably for the information presentation part 108 to present the information. The information presentation part 108 presents the information received from the presenting information generator 107 to the user. The presentation is generally made by displaying the information on a display and outputting the information as speech from a speaker. It is of course possible to selectively adopt either one of the screen display or the speech output.

The information request part 109 requests each of the information service centers 310 to 370 to transmit information necessary for the route guidance performed by the processor 104.

Next, by referring to flowcharts of FIGS. 3 to 6, the route guidance unique to the information terminal device 100 is described. Assume, herein, that the user of the information terminal device 100 moves to a vicinity of a destination by car, and then reaches the destination on foot. Note, for the sake of simplicity, descriptions of the operation based on the PPP and the operation of the ISP 200 and the access point 210 are omitted as being well-known techniques.

Figure 3:
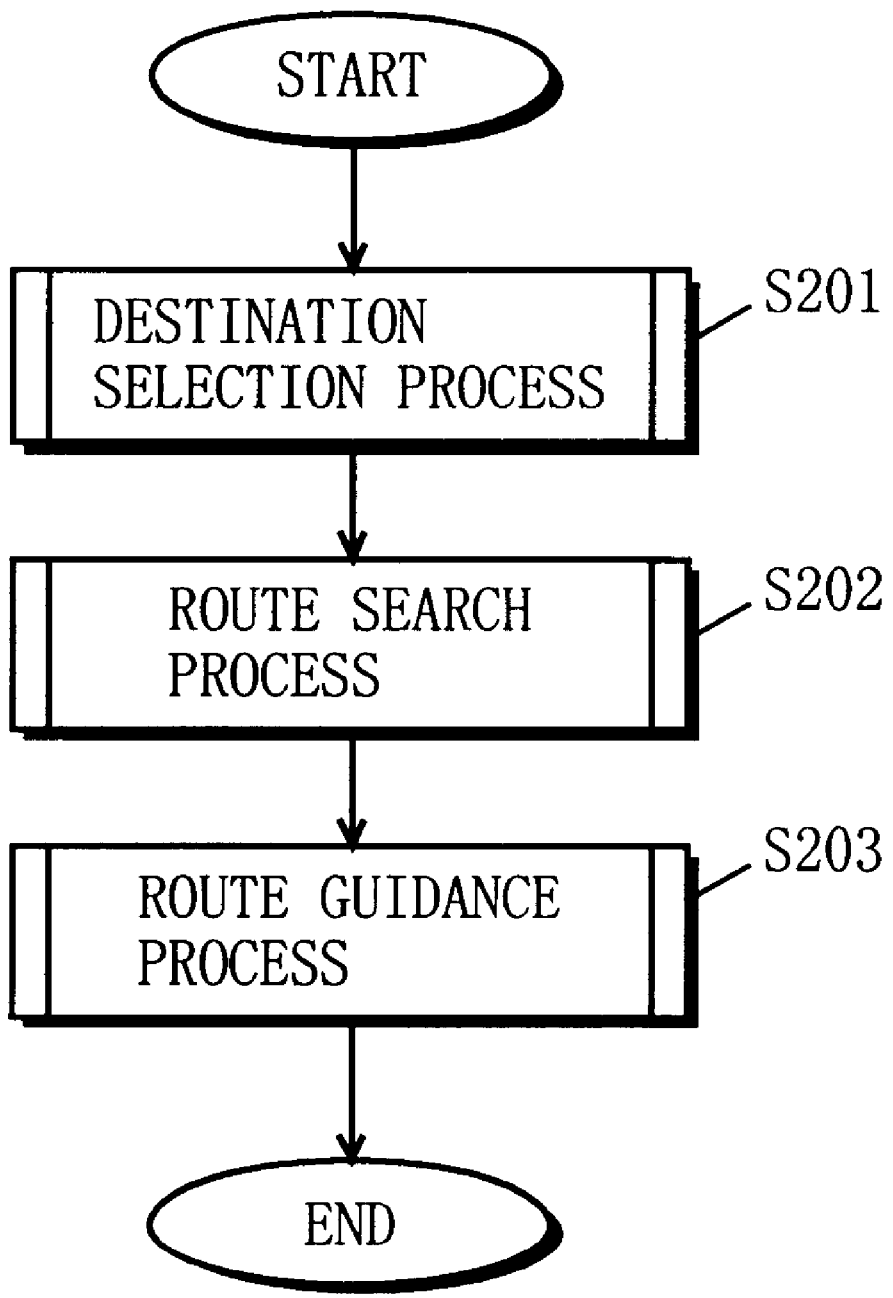
FIG. 3 is a flowchart showing an outline of the operation of the information terminal device 100 in FIG. 1.
Figure 4:
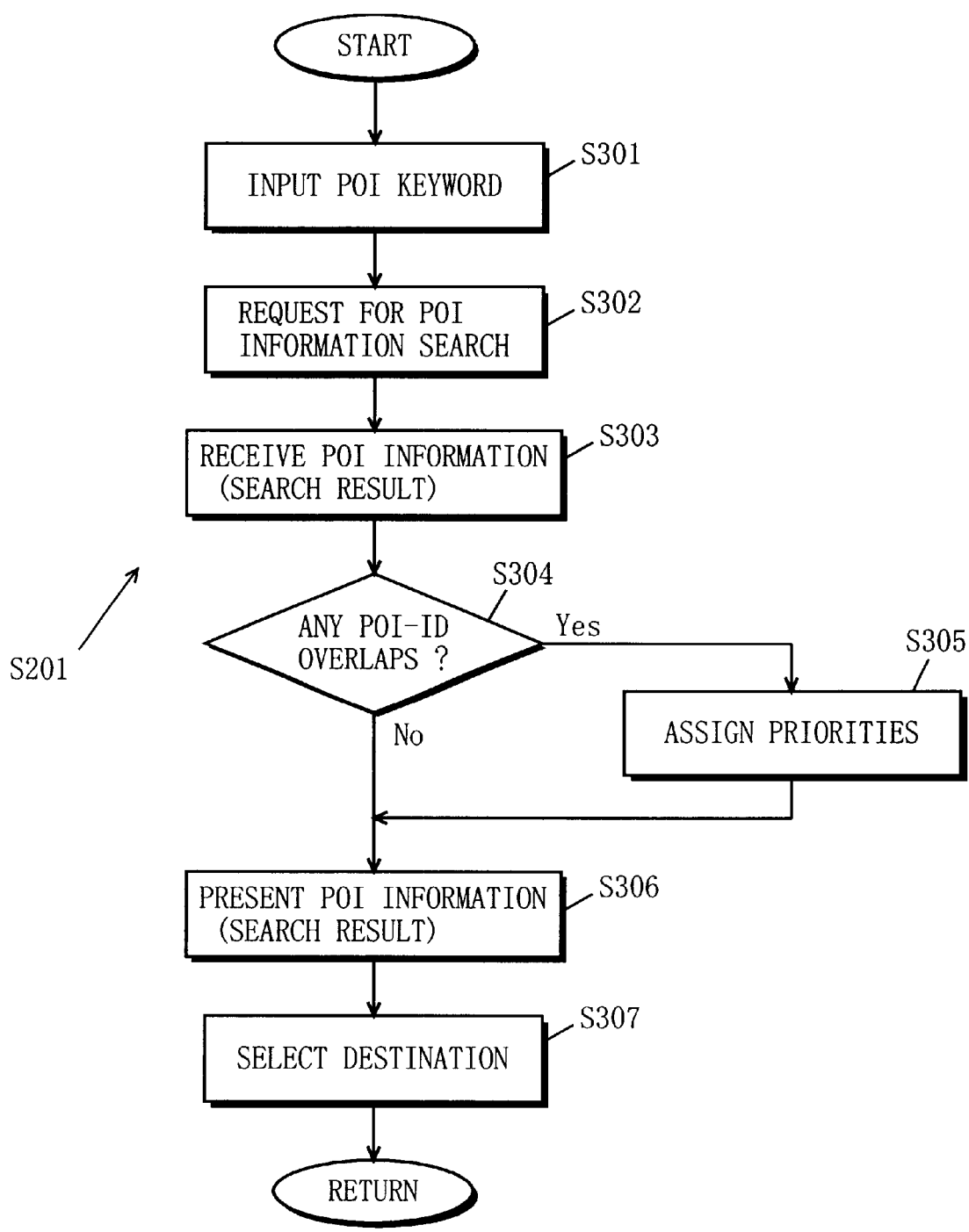
FIG. 4 is a flowchart showing a detailed procedural flow of destination selection processing in FIG. 3.

In FIG. 3, the information terminal device 100 first selects a destination to start route guidance (step S201). The detailed procedural flow in step S201 is shown in FIG. 4. In FIG. 4, a keyword of the destination, which the user is heading for (POI), is inputted to the input part 101 (step S301). The processor 104 searches the storage 103 for POI information matching with the keyword received from the input part 101. The processor 104 then transmits the keyword for POI information search to the information service center 310 through the information request part 109. In this manner, the information request part 109 requests the information service center 310 to start searching for the POI information (step S302). Note that the processor 104 may transmit the keyword to a plurality of information service centers 310 and 320. Further, the keyword once received at the information service center 310 may be transferred to the information service center 320. The information service centers 310 and/or 320 search for the POI information based on the keyword and transmit the search result to the information terminal device 100.

The result of the search made by the information service centers 310 and/or 320 is received at the information receiver 106 (step S303), and then forwarded to the analysis part 105. At this point, the analysis part 105 can not figure out the type and contents of the received information. The analysis part 105 therefore analyzes the received information and forwards the analysis result to the processor 104. In this manner, the processor 104 receives the result of the search made by the information service centers 310 and/or 320. Here, in a case where the processor 104 searches the storage 103 using the same keyword as described above, the processor 104 may also receive the result of the search from the storage 103.

FIGS. 7(*a*) to 7(*d*) show information types of the search results transmitted from the information service centers 310 to 370. The information types in the drawings are basically equivalents of SGML (Standard Generalized Markup Language) or XML (extensible Markup Language) The result of the search in the storage 103 may take the tag format or a format after tag analysis. The structure shown in FIG. 2 is based on the latter.

FIG. 7(*a*) defines an information type called "ID-type". In FIG. 7(*a*), def [ID] is the definition of the ID-type. <IDname> and </IDname> are tags for specifying a name of POI information. <size> and </size> are tags for specifying a data size of the POI information. <update> and </update> are tags for specifying a date when the POI information is updated.

As is obvious from the above, the tag is represented as a specific character string parenthesized with <> or </>. A starting tag is indicated by <> and an ending tag is indicated by </>. Between the starting tag and the ending tag, a character string representing real data is inserted. The ID-type information shown in FIG. 7(*a*) is exemplarily described as below.

def [ID]
        <IDname>X trading company</IDname>
        <size>206 bytes</size>
        <update>Jan. 28, 1999</update>

According to the above example, the name of the POI is X trading company which is inserted between <IDname> and </IDname>.

The data size of the POI information on X trading company is 206 bytes, and the latest update thereof is done on Jan. 28, 1999.

FIG. 7(*b*) defines "POI-ID-type" particularly used for the POI information, which is a feature of the embodiment. The POI-ID-type information is a type of the ID-type format shown in FIG. 7(*a*) but differs in, as shown in FIG. 7(*b*), that it includes tags for a phone number. To describe in more detail, in FIG. 7(*b*), def [POI-ID] is the definition of POI-ID-type. <phone> and </phone> are the tags for specifying a phone number. Note that <IDname> and </IDname>, <size> and </size>, and <update> and </update> are as described in the above. The POI-ID-type information shown in FIG. 7(*b*) is exemplarily described as below.

def [POI-ID]
        <IDname>X trading company</IDname>
        <size>206 bytes</size>
        <update>Jan. 28, 1999</update>
        <phone>03-3333-0000</phone>

According to the above example, the phone number of the POI is 03-3333-0000 which is inserted between <phone> and </phone>.

FIG. 7(C) defines an information type called "POS-type" (Position-type). The POS-type information is information to specify coordinates information on a position relevant to the POI (typically a POI location). <longitude> and </longitude> are tags for specifying a longitude of the position relevant to the POI. <latitude> and </latitude> are tags for specifying a latitude thereof. The POS-type information shown in FIG. 7(c) is exemplarily described as below.
    def [POS]
        <longitude>135° 35' 35" and 35 east longitude</longitude>
        <latitude>41° 41' 41" and 41 north latitude</latitude>

According to the above example, the longitude of the POI is 135° 35' 35" and 35 east longitude as inserted between <longitude> and </longitude> and the latitude thereof is 41° 41' 41" and 41 north latitude as inserted between <latitude> and </latitude>.

FIG. 7(d) defines an information type called "POI-type". The POI-type information is information to specify attributes and contents of POI information in detail. In FIG. 7(d), def [POI] is the definition of the POI-type. [POI-ID] shown one line below is the POI-ID-type information (tag format) shown in FIG. 7 (b). Accordingly, at the head of the POI-type information, at least the name and the phone number of the POI are set. <kind> and </kind> are tags specifying a type of POI. POI has various types such as restaurants, hotels, and tourist attractions. <zip> and </zip> are tags specifying a zip code of a POI location. <address> and </address> are tags specifying an address of a POI location. <url> and </url> is described with a URL of a home page on the Internet that includes information on POI. It is also possible to access various information from the home page. <service> and </service> are tags specifying a service offered by POI. Here, the service is, for example, information on a discount or on a lunch offered at a special price. In other words, the service that an owner of the POI wishes to advertise is inserted between the tags. Similarly, <worktime> and </worktime> show business days and hours. <bodyinfo> and </bodyinfo> are tags specifying a form (type) of contents information that is described thereafter. In specific, a word "text", "image", "audio", "video", or "HTML" (Hyper Text Markup Language) is inserted between the tags. <body>and </body> are tags specifying contents information on POI. A body of the contents information such as text data, image data, audio data, video data, or data described in HTML is inserted between the tags.

The processor 104 receives the search result of the above described information types. In the mean while, in step S201, only a selection of a destination is required, and therefore the information presentation part 108 is required to present only minimum information allowing the selection of the destination. Accordingly, at this point of time, each of the storage 103, the information service centers 310 and/or 320 transmits the search result composed only of [POI-ID] to the information terminal device 100.

In this embodiment, searches are performed in a plurality of constituents (i.e., storage 103, information service centers 310 and 320), respectively. Therefore, the processor 104 may receive the search results having the same [POI-ID]. If the received [POI-ID] is overlapping with any other [POI-ID] (step S304), the procedure advances to step S305. Herein, the processor 104 searches the ID-name and the phone described in each [POI-ID] to find overlapping search results. That is, the processor 104 judges a [POI-ID] as identical to any other [POI-ID] having the same ID-name and phone. On the other hand, if there is no overlapping [POI-ID], the processor 104 forwards the received search results to the presenting information generator 107 without executing step S305.

First, in step S305, the search results having the same [POI-ID] are selected for processing- Next, the processor 104 assigns priorities to the selected search results (step S305). The following three methods are presumable for assigning priorities in the embodiment. A first method is that the processor 104 searches each <size> of the selected search results and gives higher priority to the search result having larger data size. In this case, the detail of information is prioritized. A second method is that the processor 104 also searches <size> and gives higher priority to the search result having smaller data size. In this case, the reduction in communication costs and a time required for retrieving POI information is prioritized. A third method is that the processor 104 searches each <update> of the search results and gives higher priority to the one having the later date of update- In this case, freshness of information is prioritized. Any of the above three methods is previously set in the information terminal device 100 to meet the user's preference.

After assigning the priorities to the overlapping search results in the above described manner, the processor 104 forwards all of the search results received thereat and the priorities assigned to the overlapping search results to the presenting information generator 107.

The presenting information generator 107 refers to the priorities and formats the received search results suitably for the information presentation part 108 to present information. It goes without saying that the presenting information generator 107 simply formats the received search results if step S305 is not executed. The information presentation part 108 presents the search results in the suitable form to the user (step S306). In this manner, the information presentation part 108 presents candidates for a destination (POI) to the user.

Figure 8:
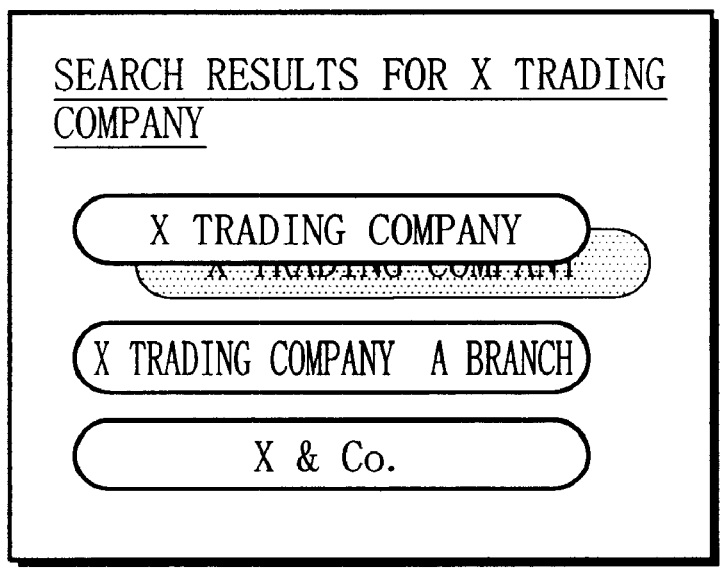
FIGS. 8(a) and 8(b) show exemplary presentations of search results in step S306 of FIG. 4.
Figure 8:
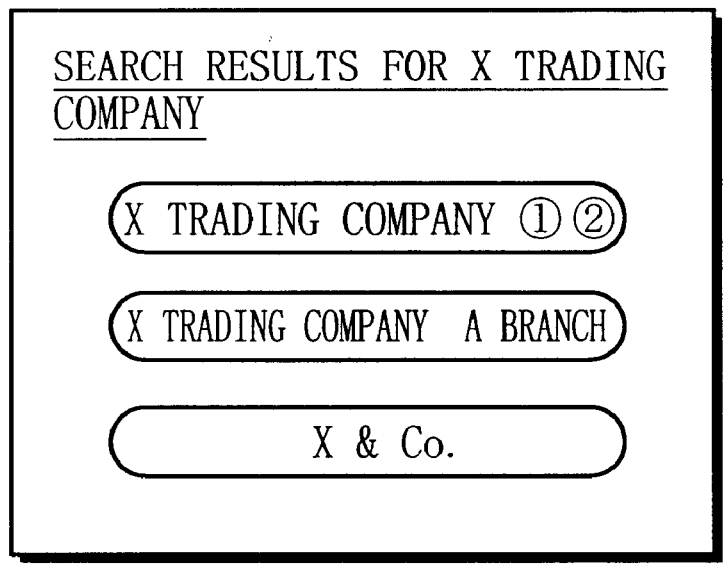

FIGS. 8(a) and 8(b) show examples of information presentations by the information presentation part 108. In the examples, assume that the number of search results indicating X trading company is two. In FIG. 8(a), of the two search results, one assigned the higher priority is displayed on a top layer, partially covering the other. In FIG. 8(b), the search results are numbered ( and By in order of precedence, and small buttons are displayed to select each information. From such displays, the user is notified of the search results of POI information in order of precedence.

The user operates the input part 101 to select any one of the candidates (POIs) presented by the information presentation part 108. The selected POI is set as the destination (step S307) As described, there is no necessity for the detailed POI information (see FIG. 7(d)) at this point of time as the purpose herein is only selecting a destination. Therefore, each of the storage 103, the information service centers 310 and/or 320 preferably transmits the search result composed only of [POI-ID] (see FIG. 7(b)) in response to the request made in step S302, thereby reducing communication traffic on the Internet 400 etc., and lightening the load of the processor 104.

The user may, in some cases, wish to obtain more detailed POI information on the destination. In such cases, the user operates the input part 101 to specify the [POI-ID] of the destination. In response to the user operation, the processor 104 transmits the specified [POI-ID] through the information request part 109 to the information service center 310 or 320 that originally transmitted the specified [POI-ID]. In this manner, it is possible to easily receive the detailed POI information of the POI-type (see FIG. 7(d)) even at this point of time. Further, the [POI-ID] includes the phone number, as described. With the phone number described in the [POI-ID], the user can make a phone call to get detailed POI information even if using a mobile phone having limited display capability as the information terminal device 100.

Once the destination is set (FIG. 3; step S201), processing for searching a route from the present location of the information terminal device 100 to the destination is executed (step S202). The detailed flow of the route search processing is described by referring to FIG. 5. First, the processor 104 transmits the selected [POI-ID] (destination) and the present location detected by the locator 102 to the information service center 330 through the information request part 109, and requests to figure out a route from the present location to the destination (step S401). The information service center 330 calculates the route based on the received present location and the destination. A method of the calculation may be any type but generally used are modified Dijkstra methods or an A* method. Based on the result of the route calculation (route information), the information service center 330 further generates guidance information required for guiding the information terminal device 100. The information service center 330 transmits the route information and the guidance information in a set to the information terminal device 100.

The processor 104 receives the set of the route information and the guidance information through the information receiver 106 and the analysis part 105 (step S402).

Note that the route from the present location to the destination also can be calculated in the information terminal device 100 as is done in general car navigation systems. If the calculation is made in the information service center 330 as in the embodiment, however, a computer having higher computing facility can be used and cartographic data used for calculation can be wholly stored in main memory of the computer, enabling route calculation at high speed.

Next, by referring to FIGS. 9(*a*) and 9(*b*), the route information and the guidance information are described in detail. Shown in FIG. 9(*a*) is the definition of a route-type that indicates the route information, and each tag described therein has the following meaning.

[ID] is similar to the ID-type information shown in FIG. 7(*a*) and includes ID information for specifying the calculated route. In the [ID], a name, a data size of the route, and a date of data update (date of data creation) are described. <roadname> and </roadname> are tags specifying a name of a road to be passed to reach the destination. The name of the road to be passed is inserted between the tags. <crossname> and </crossname> are tags specifying a name of a crossing at which the user is to turn to reach the destination. The name of the crossing is inserted between the tags.

In FIG. 9(*a*), [POS] is shown in a plurality of places. Each [POS] is the same as that described by referring to FIG. 7(*c*). In FIG. 9(*a*), each portion in parentheses () located immediately on the right of [POS] shows the position of what is indicated by the [POS]. For example, [POS] described just below <crossname> and </crossname> specifies the location of the crossing by the longitude information and latitude information.

In addition to the above basic route information (route calculation result), <disttonext> and </disttonext> tags specify a distance between branch points on the route, and <direction>and </direction> tags specify a direction of a turn. A name of a road, a name of a crossing, a distance between branch points, and a direction of a turn are treated as one set and therefore are described as many times as the number of branch points existing on the route. Note that, in a case of a road having no specific name, information capable of specifying the road is described instead. Such information is, for example, a connection angle of a road with respect to the crossing being one end of the road.

Furthermore, in the route information, a start point location, a destination location, and a passing point location are each described by the POS-type information as the information used for the route calculation. The number of [POS] information described in the route information is one for each of the start point location and the destination location but may be as many as required for the passing point location.

Between <parameter> and tags, a search parameter is inserted. The search parameter is for reflecting a preference of the user in route calculation. If the route search is performed for a car, the user sets, for example, whether or not to use toll roads and ferryboats. If walking, the user may set an upper limit for walking distance, a time distance, or a fair. As a result, if the user is in hurry, for example, he/she is guided to the closest taxi stand.

FIG. 10(*a*) shows one example of the route information. As shown in the drawing, the actual names of the road and crossing, the actual distance between the branch points, and the actual direction of travel are inserted between respective tags. In the example, the shortest time for driving by car is set as the search parameter. Herein, the route of the shortest time means the route that the user can reach the destination earliest in consideration of the current traffic. Other parameters include the shortest distance, which is normally used for travels on foot or by bicycle. Note that, in the example, no specific value of positional information is described for [POS], but in actuality, the positional information on each location indicated in parentheses (crossing location, start point location, destination location, passing point location) is described.

FIG. 9(*b*) is an example of a guidance-type information for representing the guidance information.

Herein, [ID] is similar to that described in the above and therein, the name, the data size, and the date of update of the guidance information are described. The guidance information is preferably given the name which has a relation with the name of the route so as to have clear correspondence therewith. If the name of the route is "route: Shibuya to Shinbashi", the name of the guidance information is "guidance: Shibuya to Shinbashi", for example. Note herein, that Shibuya and Shinbashi are the names of the places in Tokyo, Japan and indicate the start point and the destination, respectively.

<crossno> and </crossno> are tags specifying a crossing number. Between the tags, the crossing number is inserted. The crossing numbers are numbers for specifying the crossings that serve as the branch points during the guidance. The crossings described in the route information (see FIG. 9(*a*)) are given the crossing numbers in ascending order from the crossing name described first in the route information. The location and the name etc. of the crossing are thus specified by the crossing number. In FIGS. 10(*a*) and 10(*b*), for example, "Miyakezaka" described as the first crossing in FIG. 10(*a*) is specified by <crossno>1</crossno> described in the first line of FIG. 10(*b*). The second crossing and thereafter are similarly specified by the respective crossing numbers. Alternatively, crossing numbers uniquely assigned on a nationwide scale may be inserted between the <crossno> and </crossno> tags. In such case, detailed information on a crossing can be uniquely specified by the corresponding crossing number. Accordingly, by utilizing a table including the crossing numbers and information on the crossings (e.g. their locations) respectively specified by the crossing numbers, the information on the crossing can be easily searched for. Further, if such table is available, the route information can be also described with the crossing numbers without describing the crossing names and crossing locations as shown in FIG. 9(a), thereby enabling the simplification of the route information. As described, there are various merits of describing the crossing number uniquely assigned on the nationwide scale between the <crossno> and </crossno> tags.

<inroad> and </inroad> tags specify a name of a road approaching a crossing specified with the crossing number when the name of the road is inserted between the tags. Similarly, <outroad> and </outroad> tags specify a name of a road exiting from the crossing with the name of the road being inserted between the tags. Note, if the approaching road or exiting road have no specific name, they are specified in the same way as described for the route information.

Next, inserted between <poiid> and </poiid> tags is typically a name of a landmark for the route guidance at the crossing and its phone number. Note, as described, the POI-type information shown in FIG. 7(d) also includes a name and a phone number of POI. It is therefore possible for the information terminal device 100 to request any of the information service centers 310 to 370 for a search using the name and the phone number described in the guidance information (guidance-type information) as the keywords. As a result, the information terminal 100 receives the POI information regarding the landmark at the crossing from any of the information service centers 310 to 370. With the received information, the information terminal device 100 is capable of presenting a to-be-turned crossing and a direction exiting from the crossing in a manner that the user can easily follow. The detail of the presentation is described later.

FIG. 10(b) shows one example of the guidance information. In the example, information on two branch points on the route shown in FIG. 10(a) are described. At the top of the guidance information, the information on the first crossing on the route shown in FIG. 10(a) is described. As is evident from FIG. 10(a), the first crossing is Miyakezaka crossing. Further, it is found in the guidance information that the approaching road for entering Miyakezaka crossing is Aoyama street and the exiting road from the crossing is Uchibori street in east direction. For this branch point, two POIs that serve as the landmarks are described. One is the Y assembly hall, the phone number of which is 03-3333-9999, and the other is the Sakurada-moat. The detailed information on the first POI can be searched by the phone number. The detail of the guidance made herein will be described later.

The second branch point is the N-th crossing on the traffic regulation map, in which each crossing is assumed to be numbered uniquely on the nationwide scale. Other tags described in the following lines are similar to that described for the Miyakezaka crossing, and therefore the description thereof is omitted.

Figure 11:
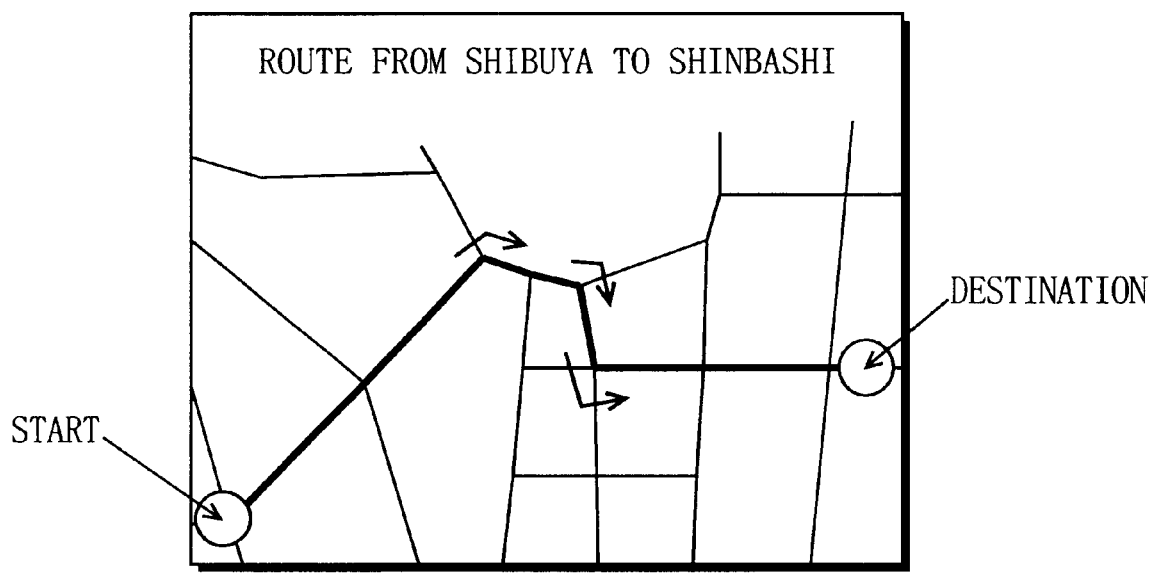
FIG. 11 is an example of a route presented by an information presentation part 108 after step S402 of FIG. 5.

In step S202, the information terminal device 100 receives the above described route information and the guidance information. In other words, the information terminal device 100 obtains minimal information required for the route guidance. At this point of time, the processor 104 may search the cartographic data stored in the storage 103 for each road connecting the crossings being the branch points to briefly present, as shown in FIG. 11, the result of the route search through the information presentation part 108. Alternatively, the processor 104 may select the cartographic data of the roads drawn from the names of the roads and crossings described in the received information for the brief route presentation.

After the route search processing in step S202, the processor 104 executes processing for guiding the user to the destination based on the received route information and the guidance information (step S203). The detailed flow of the route guidance processing is described by referring to FIG. 6. First, the processor 104 receives the present location of the information terminal device 100 from the locator 102 (step S501). Note that the present location may be inputted directly to the information terminal device 100 by the user through the input part 101, or may be transmitted to the information terminal device 100 after being searched for by any of the information service centers. At the end of the processing in step S501, the processor 104 presents the present location of the information terminal device 100 to the user through the information presentation part 108 in such form that the present location is suitably located on the route to be traveled.

Further, based on the received present location, the processor 104 determines whether or not the information terminal device 100 is in the vicinity of the destination (step S502). If Yes, the processor 104 executes processing in step S508, which will be described later.

On the other hand, if determined No, the processor 104 executes processing in step S503. In step S503, the processor 104 calculates the distance between the present location and the next branch point to determine whether or not now is the timing for guidance (step S503). If determined No, that is, if the information terminal device 100 is not close enough to the next branch point, the user is required to keep on driving along the road. The processor 104 therefore does not need to present the guidance information to the user. Accordingly, the processor 104 skips the procedure in steps S504 to S507 and goes back to step S501 to again start the route guidance processing.

On the other hand, if determined Yes in step S503, that is, if the information terminal device 100 is close enough to the next branch point, the processor 104 executes processing in step S504. Processing in steps S504 to S507 is described in detail by taking the second branch point shown in FIG. 10(b) as the example. First, the information terminal device 100 presents the description of the guidance information to the user (step S504). The user is thus notified that he/she is now close to the crossing specified by the N-th crossing on the traffic regulation map. According to the guidance information in FIG. 10(b), the information terminal device 100 is required to enter Toranomon crossing (specified by the crossing number N) from Sakurada street, pass the crossing, and exit therefrom to Sotobori street. The landmark (POI) of the approaching crossing is presented by only its name, i.e. Z store, and its phone number.

The processor 104 uses the name and the phone number as keywords, and transmits the keywords to the information service center 350 or 360 through the information request part 109 to request a search for the POI based on the keywords (step S505). To be specific, the processor 104 transmits, as control data, such search request that is shown in FIG. 12(a) including the phone number as the keyword to the information service center 350 or 360 providing the detailed POI information. Upon receiving the search request, the information service center 350 or 360 performs a keyword search. As the search processing performed by the information service center 350 or 360 is a simple database search, description is omitted herein. When finding the detailed POI information matching with the keyword in the database, the information service center 350 or 360 transmits the detailed POI information of the type shown in FIG. 7(d) as the search result to the information terminal device 100.

The search results transmitted from the information service centers 350, and the like are received at the information receiver 106 (step S506) and then forwarded to the analysis part 105. The analysis part 105 analyzes each search result for the processor 104. The processor 104 outputs the search results transmitted from the information service centers 350, and the like all together to the presenting information generator 107. The presenting information generator 107 formats the search results so that the information presentation part 108 can present the search results. The information presentation part 108 presents the search result received from the presenting information generator 107 to the user (step S507). FIG. 12(*b*) is one example of the search result, in which the detailed POI information on Z store is shown. As the search result shown in FIG. 12(*b*) is of the same type as the information shown in FIG. 7(*d*), detailed description of each item therein is omitted.

Note, however, in FIG. 12(*b*), "." inserted between the <address> and </address> tags means omission. Between the tags <body> and </body>, a data file having the HTML format is actually described. More specific, the contents including text data, image data, audio data, video data, and the like are described.

Description has been made above on the assumption that the POI information is received by using the phone number as the keyword. With the similar scheme, it is also possible to search for a phone number based on a name, or to ask the information service center 350 or 360 for conversions between an address and coordinates, a phone number and coordinates, a zip code and coordinates, and the like.

Figures 13, 14:
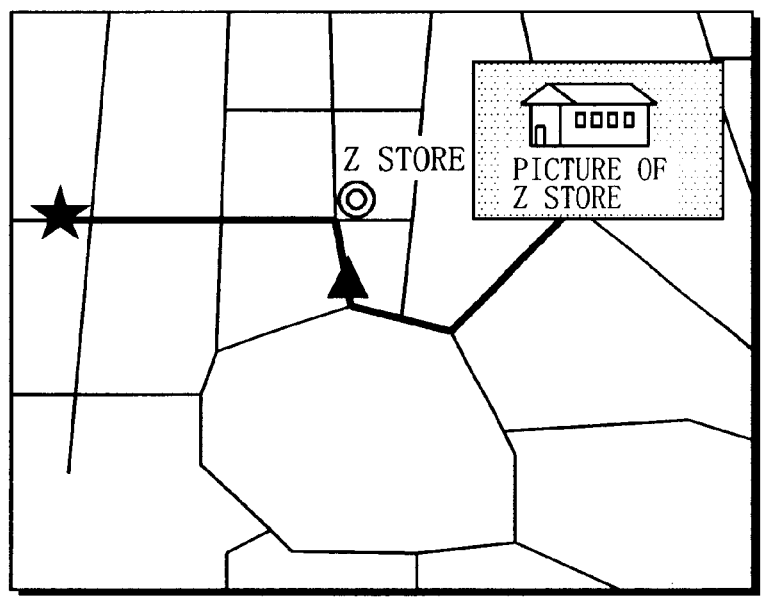
FIG. 13 shows an example of information presented in step S507 of FIG. 6.
FIG. 14 is a MAP-type definition that is handled by the information terminal device 100 and the information service center 310, and the like according to each embodiment.
Figure 18:
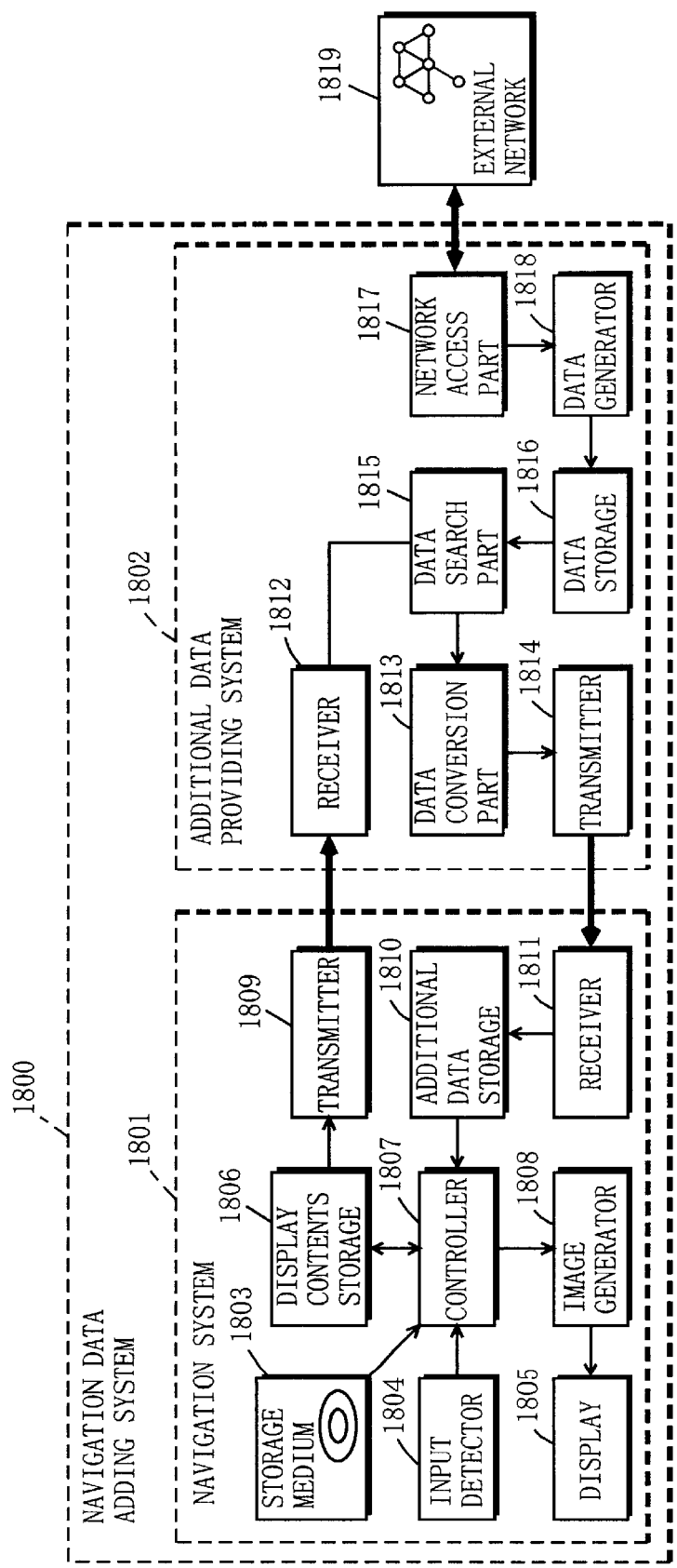
FIG. 18 is a conventional information terminal device disclosed in the publication "Japanese Patent Application Laying-Open No. 9-229694 (1997/229694)" and a communications environment thereof.

As such, in the present embodiment, the detailed POI information is described by using the tags. Particularly, the location of the POI can be easily specified by combining the <longitude> tags and the <latitude> tags, or simply by the <address> tags. Accordingly, the POI information becomes related more closely to the cartographic data, thereby enabling the processor 104 to easily superimpose the detailed POI data such as an image on the map displayed based on the cartographic data. In this manner, the image of the landmark at the branch point is simultaneously presented with the map. For example, as shown in FIG. 13, the picture of the POI (e.g. Z store) is presented in the proximity of the branch point so that the user can easily find the branch point.

It is also effective to present a map locally showing the detail for easier recognition of the branch point. In this case, the information terminal device 100 receives cartographic data from the information service center 340 in a MAP-type description shown in FIG. 14. In [ID] of the MAP-type information, similarly to the other IDs, a name, a data size and a date of update for specifying cartographic data are described.

The map presented on the information terminal device 100 has two types, i.e., a bit-map data for presenting a map as an image and a vector map that represents roads as vectors. Between <type> and </type> tags, either one of the types is inserted to specify the type of the cartographic data that is specified by the [ID].

Between <function> and </function> tags, a use of the cartographic data is inserted to specify the use of the cartographic data specified by the [ID]. Such uses include, for example, display, calculation of location and route, and route guidance.

Between <maker> and </maker> tags and between <format> and </format> tags, a creator of cartographic data and a format type thereof are inserted, respectively. These items are included in the MAP-type information to secure adaptability to a software handling the cartographic data.

Between <dispsize> and </dispsize> tags, a size of a map is inserted to specify the size of the map to be displayed on the information presentation part 108.

Herein, [POS] is used for describing the coordinates of the top-left corner and the bottom-right corner of the map to be displayed on a display (exemplary implementation of the information presentation part 108). The boundaries of the map to be displayed on the display are thus specified. Further, from the specified boundaries, the scale of the map can be automatically determined. For example, if the area within the boundaries is one square kilometer, a scale to show less reduced map is selected and if the area is within a hundred square kilometer, a scale to show more reduced map is selected.

The body of the cartographic data, which is usually binary data, is inserted between <body> and </body> tags.

When receiving a plurality of cartographic data of the same area from a plurality of the information service centers providing cartographic data, the processor 104 therefrom selects cartographic data to be used this time with the same method of assigning the priorities in step S305. That is to say, the processor 104 selects the cartographic data to be used this time in accordance with a rule such as:

searching each <size> and give higher priority to the data of larger size;

searching each <size> and give higher priority to the data of smaller size; or searching each <update> and give higher priority to the data having more recent date of update.

In a case of selecting the largest size data, the processor 104 is giving the priority to the detail of information. In a case of selecting the smallest size data, the processor 104 is giving the priority to the reduction of the processing load of the information terminal device 100. Specifically, depending on the data formats, the plurality of received cartographic data may differ in size from each other even if the areas specified therein are the same. In such case, the selection of the smallest size data fits the purpose of reducing the processing load of the information terminal device 100. Further, in a case of selecting the data having the latest date of update, the processor 104 is giving priority to the freshness of the data.

In the above described manner, the information terminal device 100 receives the cartographic data for locally showing the detail from the information service center 340. The information terminal device 100 therefore is capable of displaying guidance screens shown in FIG. 15. On the left halves of display screens (a) and (b) shown in FIG. 15, detailed maps (overhead views) generated from the cartographic data for the vicinity of the branch point crossing, which is received from the information service center 340, are displayed, and are pointed by ② arrows, respectively. Cartographic data for a map displayed on each of the right-half screens, pointed by ① arrows, is usually stored in the storage 103, but is assumed to be originally transmitted from the information service center 330 and stored in the storage 103 as an update. The map displayed on each of the right-half screens is the vector map and can be utilized, as is the case with general car navigation systems, for map display, location detection, route search, and route guidance. The cartographic data for the vector map is small in data size since it is for generating the vector map that is not in detail. Therefore, the storage 103 in the information terminal device 100 is sufficient for storing such small data.

On the other hand, the maps on the left halves of the screens (a) and (b) are both the bit-map data, which show a quite detailed information. The cartographic data for the map therefore is large in data size and also required to be updated very often to reflect detailed changes. Accordingly, it is not preferable to store such huge data requiring frequent reconfiguration in the information terminal device 100. Instead, whenever required, the information terminal device 100 can receive detailed information on any branch point that is difficult to find for the user, by communicating with the information service center 340, as described above. Consequently, the information terminal device 100 is no longer required to store the detailed data in itself and further, becomes capable of always utilizing the latest information. The method of utilizing the detailed information in such a manner is applicable not only to the branch points but also to the present locations and the vicinities of destinations.

Herein, the information terminal device 100 receives data to show the POI in more detail from the information service center 350 or 360 dedicated to the detailed POI information and from the information service center 370 dedicated to the three-dimensional POI information. The POIs shown in more detail are pointed by ③ arrows on the screen (a) of FIG. 15, and the POIs three-dimensionally shown on the screen (b) of FIG. 15 are pointed by ④ arrows.

As described, the information terminal device 100 is able to display the self-explanatory guidance screens as shown in FIG. 15 with the information received from four information service centers 340 to 370.

The foregoing is the procedural flow in steps S504 to S507 for outputting the route guidance information. When the timing for the route guidance is over, the processor 104 determines that the information terminal device 100 has passed the branch point and returns to step S501 to repeat the procedure described above.

As guiding the route by using the maps, the information terminal device 100 travels toward the destination. If determining to have reached the vicinity of the destination in step S502, the information terminal device 100 presents guidance information indicating so (step S508). Thereafter, destination information is outputted. In the embodiment, it is assumed that the user moves to the vicinity of the destination by car, and then reaches the destination on foot. More specifically, it is assumed that the user gets off the car at the parking in the vicinity of the destination, and then walks to the destination, that is, the X trading company. In such case, the processor 104 requests the information service center 360 to transmit a floor map showing tenants in the building as the destination information (detailed POI information) (step S509). As a result, the processor 104 receives the positional information regarding the X trading company in a form of image data (step S510), and can present the location of the destination in the building to the user as shown in FIG. 16 (step S511). The user thus can reach the destination easily. Note not only the image data for showing inside the building but also cartographic data for underground malls, for example, may serve as the destination information for realizing user-friendly route guidance.

After the procedure described above, the route guidance processing, which is the main feature of the information terminal device 100, ends.

As described in the foregoing, according to the first embodiment, information is exchanged between the information terminal device 100 and one or plural of the information service centers 310 to 370 in accordance with the PPP which is used on the Internet 400 as the standard communications protocol. In other words, the information terminal device 100 and each of the information service centers do not communicate with an exclusive communications protocol. It is therefore easy to set up new information service centers or shutdown the existing information service centers. As a result, business costs for information services can be saved. Further, in comparison with the case of using the exclusive communications protocol that allows the information terminal device 100 to receive information only from specific information providers, in the case of using the communications protocol commonly used on the communications network (Internet 400) as described in the embodiment, the information terminal device 100 is able to receive various information, thereby offering users a broad range of choices of information.

Further, various information exchanged between the information terminal device 100 and each of the information service centers 310 to 370 is in the tag format. The information described in the tag format indicates the data structures and the contents of the various information used for the route guidance. Accordingly, for the route guidance, information that precisely matches user's preference can be received from each of the information service centers 310 to 370 on the Internet 400 providing enormous amount of information. Furthermore, with use of the tag format, the POI information easily becomes related more closely to the cartographic data. Therefore, a plurality of information can be presented to the user at the same time, thereby realizing the route guidance flexibly suiting the preferences of the user.

In the embodiment, the timing for route guidance is described as the timing when the information terminal device 100 comes close to the crossing described in the guidance information. Such timing, however, may be a timing when the user comes close to a sightseeing spot, or any other timing as long as relating to the points the user is interested in.

Further, in the embodiment, the case of displaying the information inside the building is exemplarily described by referring to FIG. 16. Any data will do, however, as long as describing the details of the points the user is interested in (e.g. underground mall).

(Second Embodiment)

A second embodiment of the present invention is described. The structure of the information terminal device 100 according to the present embodiment is the same as that according to the first embodiment shown in FIG. 2, and therefore the same drawing is referred to. Assume, herein, that the information terminal device 100 has a small display as a mobile phone. That means that the information presentation part 108 has a limit of display capability. The present embodiment is for realizing route guidance flexibly suiting preferences of a user even if the information presentation part 108 has the limit of display capability.

A procedural flow of the information terminal device 100 of this embodiment is also the same as that shown in FIGS. 3 to 6, but differs in the following points due to the limited capability of the information presentation part 108.

A first difference is a style of presenting the POI information (search results) in step S306 of FIG. 4. On the information terminal device 100 with the small display such as the mobile phone, characters and symbols are mainly displayed and the amount of information to be displayed is greatly limited. Therefore, the operability of the information terminal device 100 is impaired if the detailed POI information is entirely shown on the display. For this reason, the information terminal device 100 alternatively displays a list as shown in FIG. 17(*a*) on the information presentation part 108 by utilizing only the POI-ID (see FIG. 7(*b*)). If the user is willing to obtain the detailed POI information, he/she can ask for the same by dialing the phone number included in the POI-ID. In this case, the POI-type detailed information as shown in FIG. 7(d) is totally unnecessary, thereby eliminating the necessity for extra communications. As a result, the cost and time for communications, and further the storage capacity in the information terminal device 100 can be saved.

Figure 5:
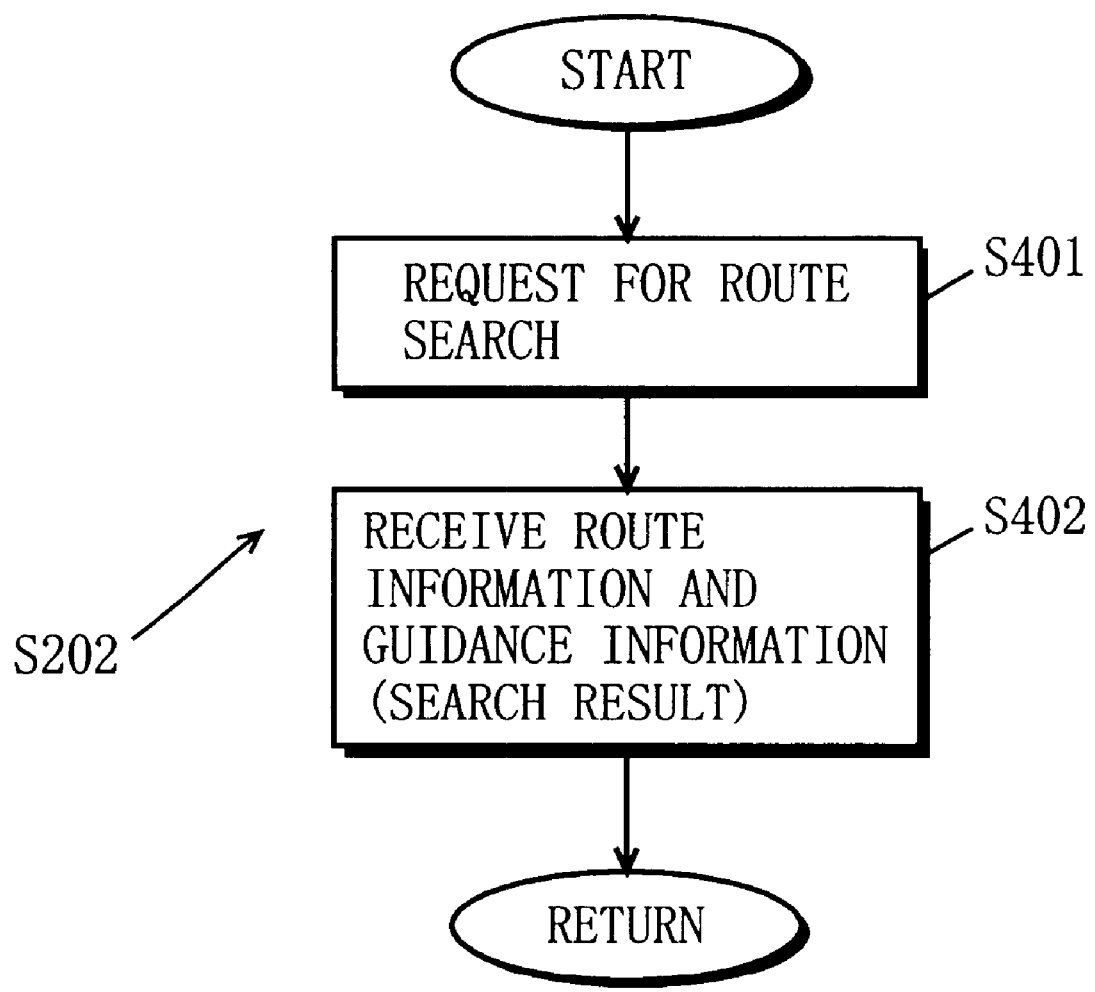
FIG. 5 is a flowchart showing a detailed procedural flow of route search processing in FIG. 3.

A second difference is a great difference in the style of presenting the route information received in step S402 of FIG. 5 (see FIG. 11 etc.). The information terminal device 100 of the present embodiment is not suitable for image display, and therefore presents the route information to the user as the example shown in FIG. 17(b). In the example, the information presentation part 108 presents, by characters and symbols, the route information showing the names of the roads, the names of the crossings being the branch points, and the turning-directions at the crossings. The guidance in the drawing instructs to go along Aoyama street to Miyakezaka crossing, turn right at Miyakezaka crossing and go along Uchibori street. Next, the guidance instructs to turn right at Sakuradamon crossing and go along Sakurada street, turn left at Toranomon crossing and go along Sotobori street to reach the destination, Shinbashi. Note that, similarly to the first embodiment, the route information received from the information service center 330 is of the type shown in FIG. 9(a).

Figure 6:
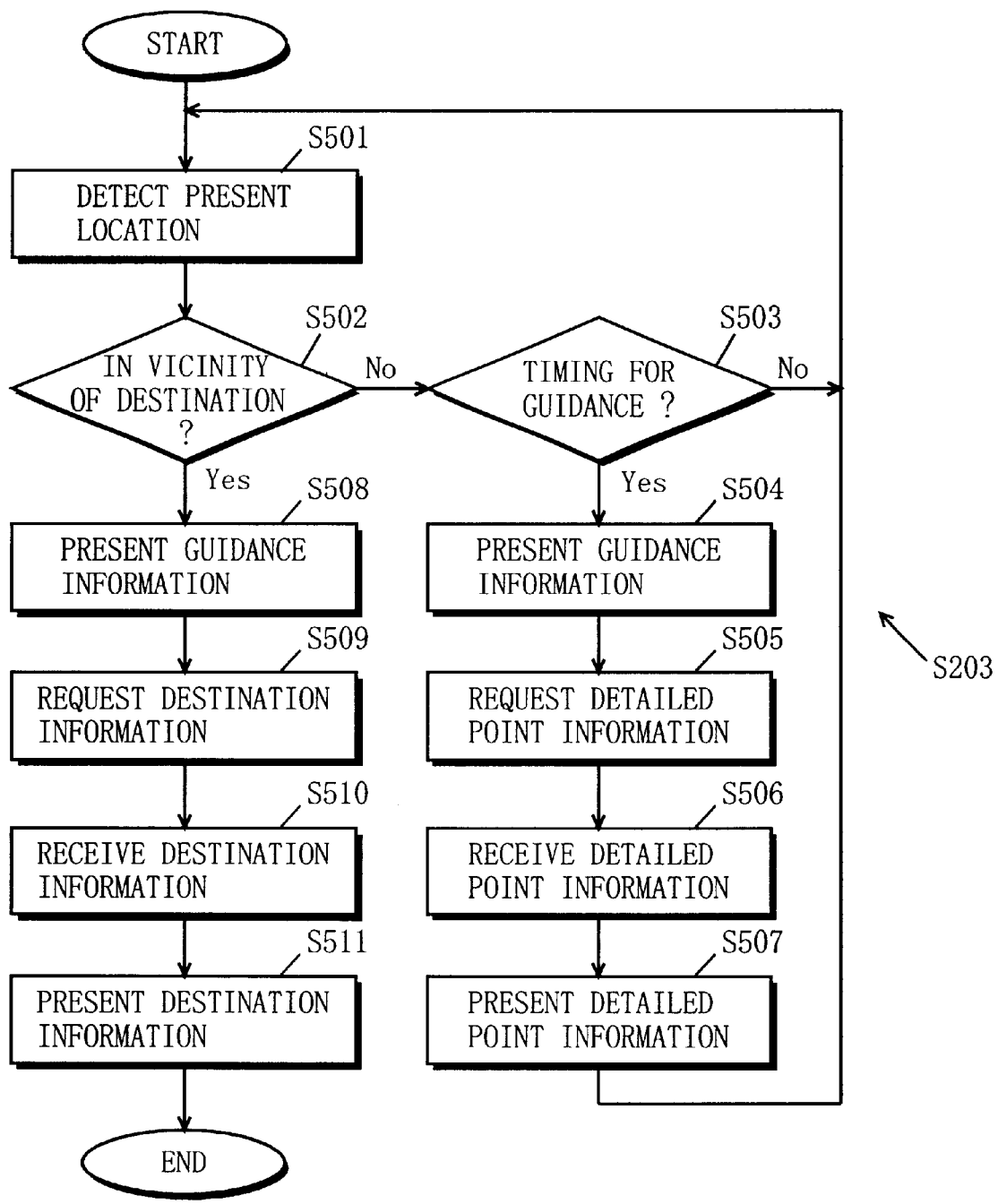
FIG. 6 is a flowchart showing a detailed procedural flow of route guidance processing in FIG. 3.

A third difference is that the guidance information described in step S504 or S508 of FIG. 6 is also presented with characters and symbols. FIG. 17(c) shows a style of presenting the guidance information corresponding to a third branch point on the route shown in FIG. 17(b). Here, the information terminal device 100 generates information to be presented only from the route information and the guidance information respectively shown in FIGS. 10(a) and 10(b). Accordingly, it is also not necessary to receive the detailed information on Z store being the landmark. Note that ▲ shown in the bottom-right of the drawing is a symbol indicating that the next guidance information exists, and that the user can scroll the screen.

In this embodiment, it is preferable not to execute steps S505 to S507 and S509 to S511, or it is not preferable to receive the detailed POI information which is typically presented by an image. This is not the case, however, if the detailed POI information is presented by characters and symbols that are small in data size.

As described, even with the information terminal device 100 of the present embodiment having the limited display capability, the route guidance is accomplished with the same procedural flow described in the first embodiment and with the same format of information received from the information service centers 310 to 370. Further, according to the embodiment, the route guidance is accomplished at low cost as only the minimal information is transmitted from the information service centers 310 to 370.

As described in the foregoing, according to the second embodiment, the data structures and the contents of the information used for the route guidance are described in the tag format. As a result, the information service centers 310 to 370 can provide various types of information without giving consideration to the capability of the information terminal device 100. In other words, the information service centers 310 to 370 are no longer required to provide information that differs depending on the capability of the information presentation part 108 of the information terminal device 100.

While the invention has been described in detail, the foregoing description is in all aspects illustrative and not restrictive. It is understood that numerous other modifications and variations can be devised without departing from the scope of the invention.

What is claimed is:

1. An information terminal device structured to be mobile and having access to a plurality of information service centers on a network that uses a predetermined protocol for communications, wherein each of the information service centers is structured as being capable of transmitting information in a tag format indicating attributes and contents of the information in accordance with the communications protocol, said information terminal device comprising:
a first receiving part operable to receive route information indicating a route from a start point to a destination and guidance information for guiding the route;
a route guidance part operable to guide the route from the start point to the destination by using first cartographic data having a basis on the route information and/or the guidance information received by said first receiving part; and
a second receiving part operable to receive, from each of the information service centers, point information in the tag format indicating details of each important point on the route guided by said route guidance part based on a distance to each of the important points wherein
said route guidance part, in guiding the route, is operable to present the point information received by said second receiver simultaneously with a map based on the first cartographic data.

2. The information terminal device as claimed in claim 1, wherein
the guidance information includes ID information simply specifying each important point, and said device further comprises
a request part operable to send a request for a search for the point information using the ID information to each of the information service centers, as required, and
said second receiving part is operable to receive the point information from each of the information service centers after the request is sent by said request part.

3. The information terminal device as claimed in claim 2, wherein
the ID information is any of a phone number, an address, and a zip code,
each of the information service centers converts any of the phone number, the address, and the zip code received as a keyword to a combination of longitude and latitude coordinates, and
said second receiving part is operable to receive the point information on each important point including the combination of the longitude and latitude coordinates thereof.

4. The information terminal device as claimed in claim 2, wherein
the ID information is a combination of the longitude and latitude coordinates,
each of the information service centers converts the combination of the longitude and latitude coordinates received as a keyword to the phone number, the address and/or the zip code, and
said second receiving part is operable to receive the point information on each important point including the phone number, the address and/or the zip code thereof.

5. The information terminal device as claimed in claim 1, wherein
the point information includes second cartographic data having a scale different from that of the first cartographic data, and
said route guidance part is operable to present a map based on the second cartographic data received by said second receiving part simultaneously with the map based on the first cartographic data.

6. The information terminal device as claimed in claim 5, wherein
the second cartographic data is cartographic data for showing an enlarged map of a vicinity of the important point.

7. The information terminal device as claimed in claim 5, wherein
the second cartographic data is cartographic data for three-dimensionally showing a vicinity of the important point.

8. The information terminal device as claimed in claim 5, wherein
said route guidance part is operable to present a map based on second cartographic data that has a largest data size simultaneously with the map based on the first cartographic data when said second receiving part receives a plurality of second cartographic data.

9. The information terminal device as claimed in claim 5, wherein
said route guidance part is operable to present a map based on second cartographic data that has a smallest data size simultaneously with the map based on the first cartographic data when said second receiving part receives a plurality of second cartographic data.

10. The information terminal device as claimed in claim 5, wherein
said route guidance part is operable to present a map based on a latest second cartographic data simultaneously with the map based on the first cartographic data when said second receiving part receives a plurality of second cartographic data.

11. The information terminal device as claimed in claim 1, wherein
the point information is second cartographic data for showing details in a building or an underground mall as being the important point, and
said route guidance part is operable to present a map based on the second cartographic data received by said second receiving part simultaneously with the map based on the first cartographic data.

12. The information terminal device as claimed in claim 1, further comprising:
a request part operable to send requests to the plurality of information service centers for searches for information relevant to a point a user is interested in, based on a keyword relevant to the point the user is interested in;
a third receiving part operable to search results from the plurality of information service centers after the requests are sent by said request part; and
a presentation part operable to present the search results received by said third receiving part to the user, wherein
said route guidance part is operable to guide a route to a point that is selected as the destination from among the search results presented by said presentation part.

13. The information terminal device as claimed in claim 12, wherein
said presentation part is operable to present a search result of a larger data size with higher priority when said third receiving part receives a plurality of search results.

14. The information terminal device as claimed in claim 12, wherein
said presentation part is operable to present a search result of a smaller data size with higher priority when said third receiving part receives a plurality of search results.

15. The information terminal device as claimed in claim 12, wherein
said presentation part is operable to present a search result of a later date of update with higher priority when said third receiving part receives a plurality of search results.

16. The information terminal device as claimed in claim 1, wherein
the point information includes first information simply specifying the important point and second information specifying the important point in detail, and
the first information includes at least tags specifying a name and a phone number of the important point.

17. The information terminal device as claimed in claim 1, wherein
the route information includes at least tags specifying a name of a road to be traveled, a name of a crossing being a branch point, a distance between the branch points, and a turning direction at the branch point.

18. The information terminal device as claimed in claim 1, wherein
a crossing number is uniquely determined for each of nationwide crossings, and
the route information includes at least tags specifying the crossing number.

19. The information terminal device as claimed in claim 17, wherein
the guidance information includes the branch point described in the route information in the tag format, and information on at least a name and a phone number of a point being a landmark for the branch point.

20. A method for route guidance used for an information terminal device structured to be mobile and having access to a plurality of information service centers on a network that uses a predetermined protocol for communications, wherein
each of the information service centers is structured as being capable of transmitting information in a tag format indicating attributes and contents of the information in accordance with the communications protocol, said method comprising:
receiving route information indicating a route from a start point to a destination and guidance information for guiding the route;
guiding the route from the start point to the destination by using cartographic data having a basis on the received route information and/or the received guidance information; and
receiving, from each of the information service centers, point information in the tag format indicating details of each important point on the guided route based on a distance to each of the important points, wherein in said guiding, the received point information is presented simultaneously with a map based on the cartographic data.

* * * * *